(12) United States Patent
Nakano

(10) Patent No.: US 12,444,772 B2
(45) Date of Patent: Oct. 14, 2025

(54) SOLID-STATE BATTERY

(71) Applicant: Murata Manufacturing Co., Ltd., Nagaokakyo (JP)

(72) Inventor: Koichi Nakano, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 957 days.

(21) Appl. No.: 17/475,906

(22) Filed: Sep. 15, 2021

(65) Prior Publication Data

US 2022/0006127 A1    Jan. 6, 2022

Related U.S. Application Data

(63) Continuation of application No. PCT/JP2020/006608, filed on Feb. 19, 2020.

(30) Foreign Application Priority Data

Mar. 27, 2019 (JP) .................................. 2019-061573

(51) Int. Cl.
*H01M 10/0585* (2010.01)
*H01M 4/13* (2010.01)
(Continued)

(52) U.S. Cl.
CPC ......... *H01M 10/0585* (2013.01); *H01M 4/13* (2013.01); *H01M 10/0525* (2013.01);
(Continued)

(58) Field of Classification Search
CPC .................................................... H01M 4/14
See application file for complete search history.

(56) References Cited

U.S. PATENT DOCUMENTS

2008/0020279 A1\*  1/2008  Schmidt .............. H01M 4/485
                                                      429/231.95
2013/0149593 A1\*  6/2013  Hayashi ................ H01M 4/66
                                                      429/160
(Continued)

FOREIGN PATENT DOCUMENTS

JP    2000195556 A  *  7/2000
JP    2009181905 A     8/2009
(Continued)

OTHER PUBLICATIONS

JP2013051209A Machine translation (Year: 2013).\*
(Continued)

*Primary Examiner* — Jonathan G Leong
*Assistant Examiner* — Aryana Y. Ortiz
(74) *Attorney, Agent, or Firm* — ArentFox Schiff LLP

(57) ABSTRACT

A solid-state battery including a solid-state battery laminate having a battery constituent unit including a positive electrode layer, a negative electrode layer, and a solid electrolyte layer interposed between the positive electrode layer and the negative electrode layer along a stacking direction; a positive electrode terminal on a first side surface of the solid-state battery laminate; and a negative electrode terminal on a second side surface of the solid-state battery laminate. The positive electrode layer and the negative electrode layer include a terminal contact portion in direct contact with the positive electrode terminal and the negative electrode terminal, respectively, and a non-terminal contact portion other than the terminal contact portion, and at least one of the positive electrode layer and the negative electrode layer has relatively small active material amount with respect to the non-terminal contact portion.

15 Claims, 8 Drawing Sheets

(51) Int. Cl.
*H01M 10/0525* (2010.01)
*H01M 50/531* (2021.01)
*H01M 50/543* (2021.01)
*H01M 50/586* (2021.01)
*H01M 50/59* (2021.01)

(52) U.S. Cl.
CPC ....... *H01M 50/531* (2021.01); *H01M 50/543* (2021.01); *H01M 50/586* (2021.01); *H01M 50/59* (2021.01)

(56) References Cited

U.S. PATENT DOCUMENTS

| | | | |
|---|---|---|---|
| 2014/0106213 A1 | 4/2014 | Horikawa et al. | |
| 2015/0017523 A1* | 1/2015 | Hirai | H01M 50/533 427/126.3 |
| 2017/0263981 A1* | 9/2017 | Satou | H01M 4/663 |
| 2018/0277850 A1* | 9/2018 | Quero-Mieres | H01M 4/622 |
| 2019/0288246 A1 | 9/2019 | Kato et al. | |

FOREIGN PATENT DOCUMENTS

| | | | | |
|---|---|---|---|---|
| JP | 2013051209 A | * | 3/2013 | |
| JP | 2016207540 A | | 12/2016 | |
| JP | 2017183052 A | | 10/2017 | |
| WO | 2013001908 A1 | | 1/2013 | |
| WO | WO-2013038880 A1 | * | 3/2013 | .......... H01M 10/052 |
| WO | 2018123319 A1 | | 7/2018 | |
| WO | 2018235398 A1 | | 12/2018 | |

OTHER PUBLICATIONS

WO2013038880A1 Machine translation (Year: 2013).*
JP2000195556A Machine translation (Year: 2000).*
Written Opinion of the International Searching Authority issued for PCT/JP2020/006608, date of mailing May 19, 2020.
International Search Report issued for PCT/JP2020/006608, date of mailing May 19, 2020.

* cited by examiner

FIG. 1 – PRIOR ART
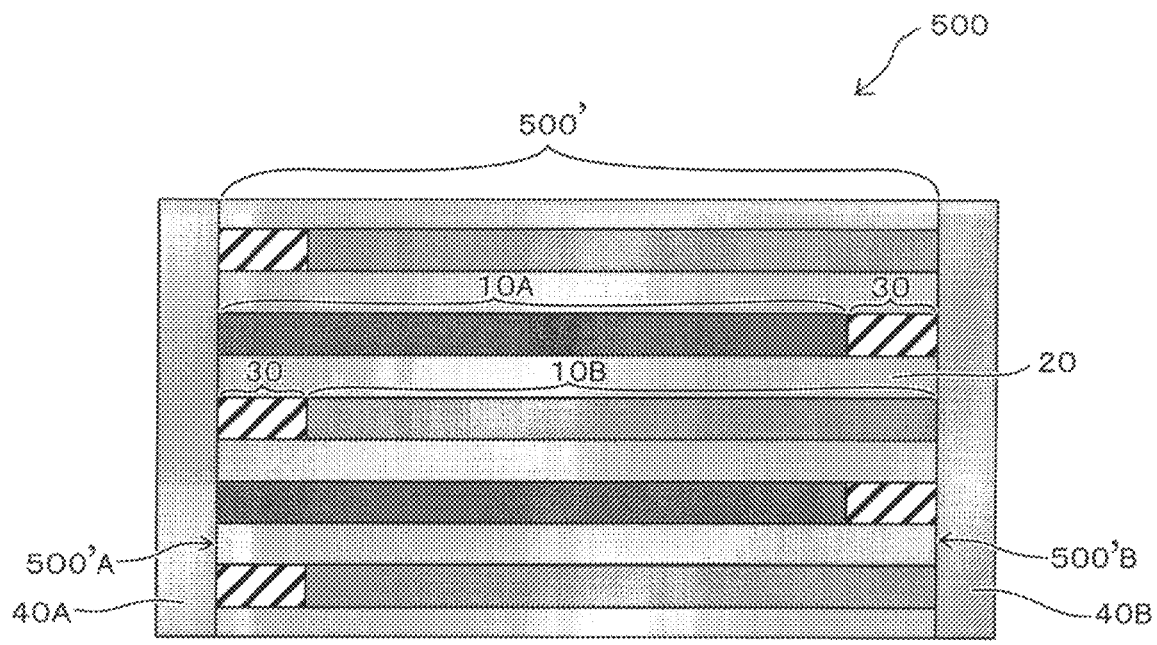

FIG. 2(A) - PRIOR ART
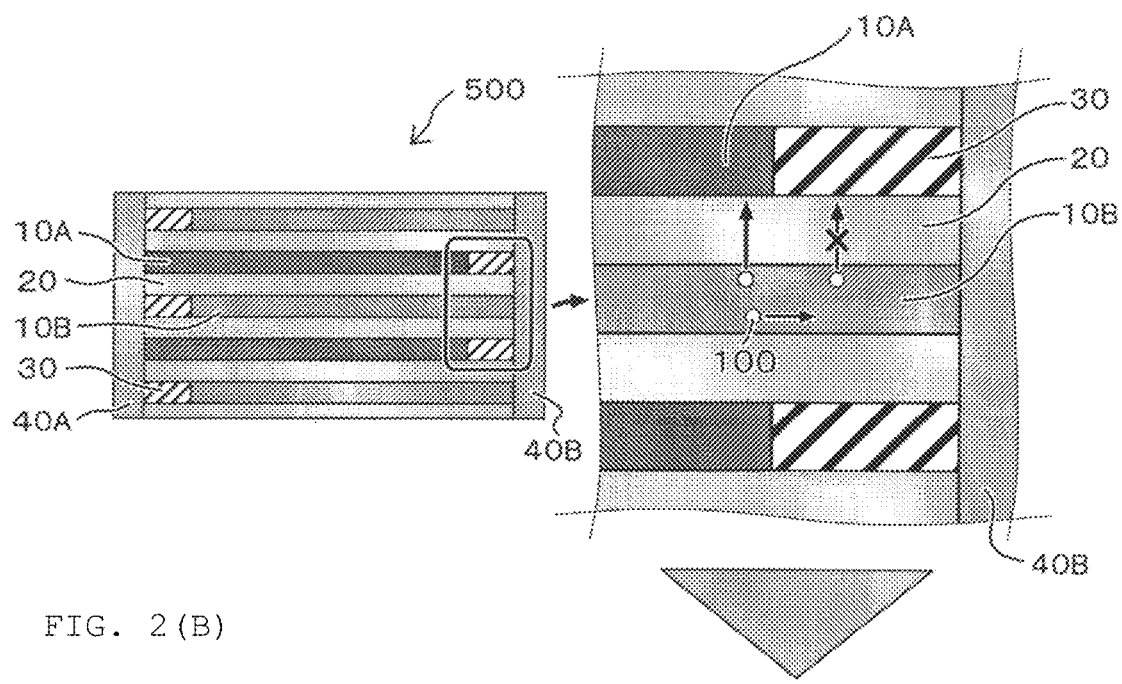
FIG. 2(B)
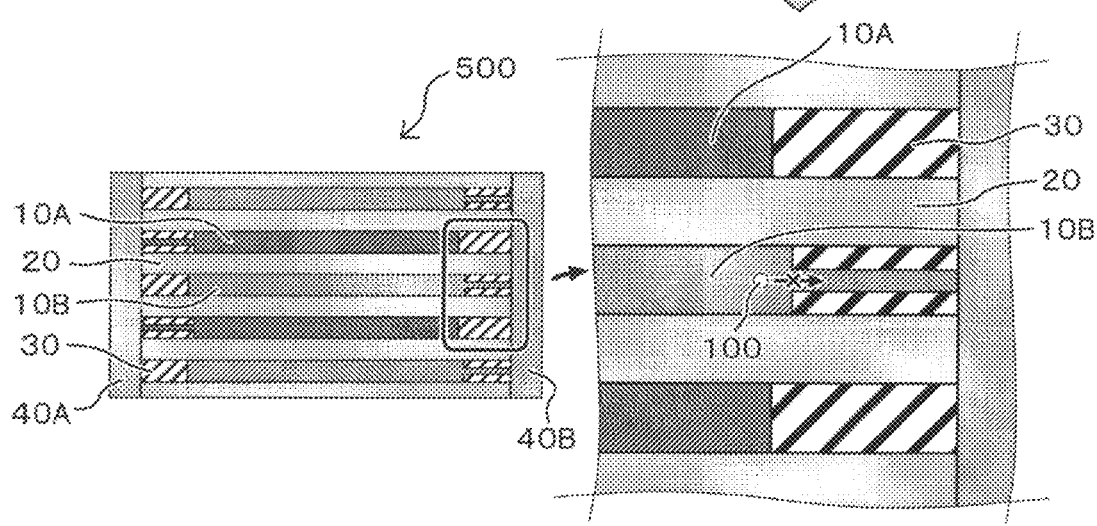

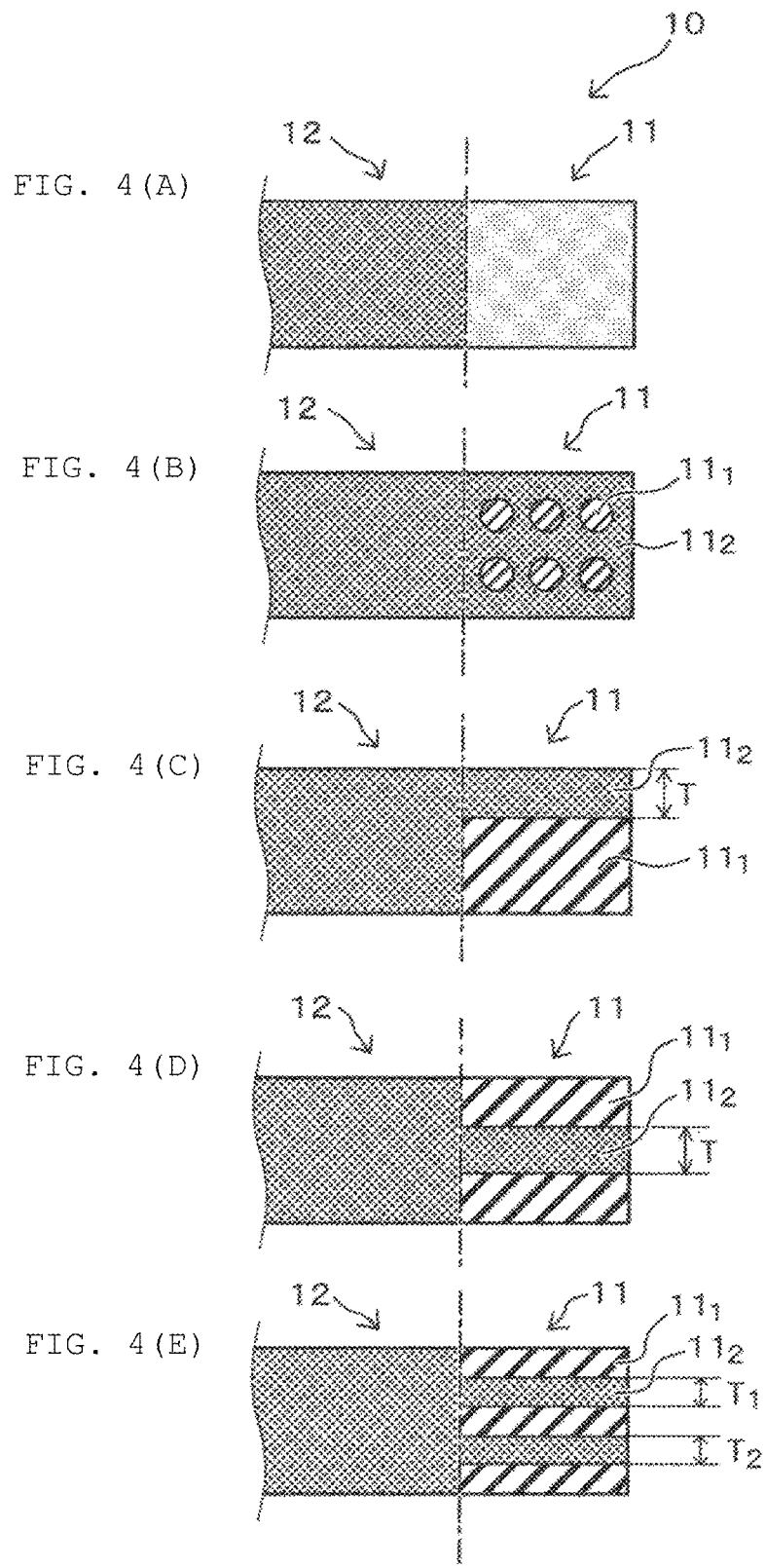

SOLID-STATE BATTERY

CROSS REFERENCE TO RELATED APPLICATIONS

The present application is a continuation of International application No. PCT/JP2020/006608, filed Feb. 19, 2020, which claims priority to Japanese Patent Application No. 2019-061573, filed Mar. 27, 2019, the entire contents of each of which are incorporated herein by reference.

FIELD OF THE INVENTION

The present invention relates to a solid-state battery. More specifically, the present invention relates to a laminated solid-state battery formed by laminating layers constituting a battery constituent unit.

BACKGROUND OF THE INVENTION

In the related art, secondary batteries that can be repeatedly charged and discharged have been used for various purposes. For example, the secondary battery has been used as a power source of an electronic device such as a smartphone and a notebook computer.

In the secondary battery, a liquid electrolyte has been generally used as a medium for ion transfer that contributes to charging and discharging. That is, a so-called electrolytic solution is used for the secondary battery. However, in such a secondary battery, safety is generally required in terms of preventing leakage of the electrolytic solution. In addition, an organic solvent or the like used for the electrolytic solution is a flammable substance, and thus the safety is also required.

Therefore, a solid-state battery using a solid electrolyte instead of the electrolytic solution has been studied.
Patent Document 1: Japanese Patent Application Laid-Open No. 2009-181905
Patent Document 2: Japanese Patent Application Laid-Open No. 2016-207540
Patent Document 3: Japanese Patent Application Laid-Open No. 2017-183052

SUMMARY OF THE INVENTION

The solid-state battery includes a solid-state battery laminate including a positive electrode layer, a negative electrode layer, and a solid electrolyte layer therebetween (refer to see Japanese Patent Application Laid-Open No. 2009-181905). For example, as illustrated in FIG. 1, in a solid-state battery laminate 500', a positive electrode layer 10A, a solid electrolyte layer 20, and a negative electrode layer 10B are stacked in this order. The solid-state battery laminate 500' is provided with a positive electrode terminal 40A and a negative electrode terminal 40B in contact with two opposing side surfaces (that is, a positive electrode side end surface 500'A and a negative electrode side end surface 500'B). Here, the positive electrode layer 10A and the negative electrode layer 10B extend so as to terminate at the positive electrode side end surface 500'A and the negative electrode side end surface 500'B, respectively. The positive electrode layer 10A is formed so as not to terminate at the negative electrode side end surface 500'B, and the negative electrode layer 10B is formed so as not to terminate at the positive electrode side end surface 500'A. An electrode separation portion 30 is provided between the positive electrode layer 10A and the negative electrode side end surface 500'B and between the negative electrode layer 10B and the positive electrode side end surface 500'A (refer to Japanese Patent Application Laid-Open No. 2016-207540 and No. 2017-183052).

The inventor of the present application has noticed that there is still a problem to be overcome in the previously proposed solid-state battery as described above, and has found a need to take measures therefor. Specifically, the inventor of the present application has found that there are the following problems.

The charge-discharge reaction of the solid-state battery can be caused by conduction of ions between the positive electrode and the negative electrode via the solid electrolyte. As illustrated in FIG. 2A, in the solid-state battery 500 in which the electrode separation portion 30 is provided between the positive electrode layer 10A and the negative electrode terminal 40B and between the negative electrode layer 10B and the positive electrode terminal 40A, there is a non-opposing region where the electrode layers (that is, between the positive electrode layer 10A and the negative electrode layer 10B adjacent to each other) adjacent in a stacking direction do not directly face each other. For this reason, there is a possibility that the ions 100 are diffused into a negative electrode layer region between the negative electrode layer 10B and the positive electrode terminal 40A at the time of charge, and it becomes difficult to take out the ions at the time of discharge, or a reduction product is likely to precipitate due to excessive ion supply in a positive electrode layer region between the positive electrode layer 10A and the negative electrode terminal 40B. Therefore, in a non-opposing region, there is a possibility of causing ion loss and non-uniformity of charge-discharge reaction. Therefore, the solid-state battery may not be suitable in terms of such a charge-discharge reaction.

The present invention has been made in view of such problems. That is, a main object of the present invention is to provide a solid-state battery more suitable in terms of reaction uniformity in an electrode layer in charging and discharging.

The inventor of the present application has tried to solve the above problems by addressing in a new direction instead of addressing in an extension of the related art. As a result, the present inventor has reached the invention of a solid-state battery in which the above main object has been achieved.

According to the present invention, there is provided a solid-state battery including a solid-state battery laminate having at least one battery constituent unit including a positive electrode layer, a negative electrode layer, and a solid electrolyte layer interposed between the positive electrode layer and the negative electrode layer along a stacking direction; a positive electrode terminal on a first side surface of the solid-state battery laminate; and a negative electrode terminal on a second side surface of the solid-state battery laminate, wherein the positive electrode layer and the negative electrode layer include a terminal contact portion that is in direct contact with the positive electrode terminal and the negative electrode terminal, respectively, and a non-terminal contact portion other than the terminal contact portion, and the terminal contact portion in at least one of the positive electrode layer and the negative electrode layer has a relatively small active material amount with respect to the non-terminal contact portion.

The solid-state battery according to an embodiment of the present invention is a more suitable solid-state battery from the viewpoint of reaction uniformity in the electrode layer in charging and discharging.

More specifically, in the solid-state battery of the present invention, ion loss due to diffusion of the ions 100 and precipitation of reduction products of the ions 100 are reduced in the non-opposing region near the terminal. As a result, the charge-discharge efficiency can be improved, and the energy density of the battery can be increased.

BRIEF EXPLANATION OF THE DRAWINGS

FIG. 1 is a sectional view schematically illustrating a solid-state battery.

FIG. 2A and FIG. 2B are schematic diagrams illustrating movement of ions in the vicinity of a terminal in the solid-state battery.

FIG. 4A to FIG. 4E are sectional views schematically illustrating a terminal contact portion having a relatively small active material amount in an electrode layer of the solid-state battery according to the embodiment of the present invention.

DETAILED DESCRIPTION OF THE INVENTION

Figure 3A:
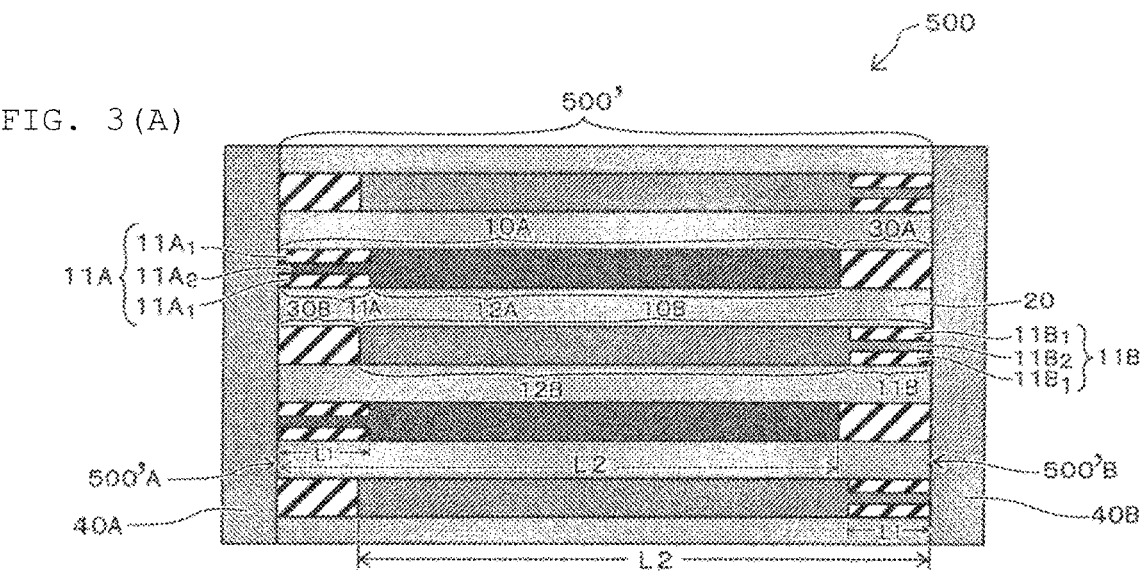
FIG. 3A to FIG. 3C are sectional views schematically illustrating a solid-state battery according to an embodiment of the present invention.

Hereinafter, the "solid-state battery" of the present invention will be described in detail. Although the description will be made with reference to the drawings as necessary, the illustrated contents are only schematically and exemplarily illustrated for the understanding of the present invention, and appearances, dimensional ratios, and the like may be different from actual ones.

The term "solid-state battery" used in the present invention refers to a battery whose constituent elements are formed of a solid in a broad sense, and refers to an all-solid-state battery whose constituent elements (particularly preferably all constituent elements) are formed of a solid in a narrow sense. In a preferred aspect, the solid-state battery in the present invention is a laminated solid-state battery configured such that layers constituting a battery constituent unit are stacked on each other, and preferably such layers are formed of a sintered body. The "solid-state battery" includes not only a so-called "secondary battery" capable of repeating charging and discharging but also a "primary battery" capable of only discharging. In a preferred aspect of the present invention, the "solid-state battery" is a secondary battery. The "secondary battery" is not excessively limited by the name, and may include, for example, a power storage device and the like.

The term "plan view" used in the present specification is based on a form in a case where an object is captured from the upper side or the lower side along a thickness direction based on a stacking direction of layers constituting the solid-state battery. In addition, the term "sectional view" used in the present specification is based on a form when viewed from a direction substantially perpendicular to a thickness direction based on a stacking direction of the layers constituting the solid-state battery (to put it briefly, a form in a case of being cut along a plane parallel to the thickness direction). The "vertical direction" and "horizontal direction" used directly or indirectly in the present specification correspond to a vertical direction and a horizontal direction in the drawings, respectively. Unless otherwise specified, the same reference numerals or symbols indicate the same members/portions or the same semantic contents. In one preferred aspect, it can be considered that a vertical downward direction (that is, a direction in which gravity acts) corresponds to a "downward direction" and the opposite direction corresponds to an "upward direction".

Basic Configuration of Solid-State Battery

The solid-state battery includes a solid-state battery laminate having at least one battery constituent unit including a positive electrode layer, a negative electrode layer, and a solid electrolyte layer interposed therebetween along a stacking direction.

In the solid-state battery, each layer constituting the solid-state battery may be formed by firing, and a positive electrode layer, a negative electrode layer, a solid electrolyte layer, and the like may form a fired layer. Preferably, the positive electrode layer, the negative electrode layer, and the solid electrolyte are each fired integrally with each other, and therefore the battery constituent unit forms an integrally sintered body.

The positive electrode layer is an electrode layer containing at least a positive electrode active material. The positive electrode layer may further include a solid electrolyte and/or a positive electrode current collecting layer. In a preferred aspect, the positive electrode layer includes a sintered body including at least a positive electrode active material, solid electrolyte particles, and a positive electrode current collecting layer. On the other hand, the negative electrode layer is an electrode layer containing at least a negative electrode active material. The negative electrode layer may further include a solid electrolyte and/or a negative electrode current collecting layer. In a preferred aspect, the negative electrode layer includes a sintered body including at least a negative electrode active material, solid electrolyte particles, and a negative electrode current collecting layer.

The positive electrode active material and the negative electrode active material are substances involved in the transfer of electrons in the solid-state battery. Ion movement (conduction) between the positive electrode layer and the negative electrode layer via the solid electrolyte and electron transfer between the positive electrode layer and the negative electrode layer via an external circuit are performed, and thereby the charging and discharging are performed. The positive electrode layer and the negative electrode layer are preferably layers capable of occluding and releasing lithium ions, sodium ions, and the like as ions, particularly lithium ions. That is, the all-solid-state secondary battery is preferably an all-solid-state secondary battery in which lithium ions or sodium ions move between the positive electrode layer and the negative electrode layer via the solid electrolyte to charge and discharge the battery.

(Positive Electrode Active Material)

The positive electrode active material contained in the positive electrode layer is, for example, a lithium-containing compound. The kind of the lithium-containing compound is not particularly limited, and examples thereof include a lithium transition metal composite oxide and a lithium transition metal phosphate compound. The lithium transition metal composite oxide is a generic term for oxides containing lithium and one kind or two or more kinds of transition metal elements as constituent elements. The lithium transition metal phosphate compound is a generic term for phosphate compounds containing lithium and one kind or two or more kinds of transition metal elements as constituent elements. The kind of the transition metal element is not particularly limited, and examples thereof include cobalt (Co), nickel (Ni), vanadium (V), chromium (Cr), manganese (Mn), and iron (Fe).

The lithium transition metal composite oxide is, for example, a compound represented by each of $Li_xM1O_2$ and $Li_yM2O_4$. The lithium transition metal phosphate compound is, for example, a compound represented by $Li_zM3PO_4$. However, each of M1, M2, and M3 is one kind or two or more kinds of transition metal elements. The respective values of x, y, and z are optional (but, not zero (0)).

Specifically, the lithium transition metal composite oxide is, for example, $LiCoO_2$, $LiNiO_2$, $LiVO_2$, $LiCrO_2$, $LiMn_2O_4$, or the like. Examples of the lithium transition metal phosphate compound include $LiFePO_4$ and $LiCoPO_4$.

Examples of the positive electrode active material capable of occluding and releasing sodium ions include at least one selected from the group consisting of a sodium-containing phosphate compound having a NASICON-type structure, a sodium-containing phosphate compound having an olivine-type structure, a sodium-containing layered oxide, and a sodium-containing oxide having a spinel-type structure.

(Negative Electrode Active Material)

Examples of the negative electrode active material contained in the negative electrode layer include a carbon material, a metal-based material, a lithium alloy, and a lithium-containing compound.

Specifically, the carbon material is, for example, graphite (graphite), graphitizable carbon, non-graphitizable carbon, mesocarbon microbeads (MCMB), or highly oriented graphite (HOPG).

The metal-based material is a generic term for materials containing any one kind or two or more kinds among metal elements and metalloid elements capable of forming an alloy with lithium as constituent elements. The metal-based material may be a simple substance, an alloy (for example, a lithium alloy), or a compound. Since the purity of the simple substance described here is not necessarily limited to 100%, the simple substance may contain a trace amount of impurities.

Examples of the metal element and the semi-gold group element include silicon (Si), tin (Sn), aluminum (Al), indium (In), magnesium (Mg), boron (B), gallium (Ga), germanium (Ge), lead (Pb), bismuth (Bi), cadmium (Cd), titanium (Ti), chromium (Cr), iron (Fe), niobium (Nb), molybdenum (Mo), silver (Ag), zinc (Zn), hafnium (Hf), zirconium (Zr), yttrium (Y), palladium (Pd), and platinum (Pt).

Specifically, the metal-based material is, for example, Si, Sn, $SiB_4$, $TiSi_2$, SiC, $Si_3N_4$, $SiO_v$ ($0<v\leq 2$), LiSiO, $SnO_w$ ($0<w\leq 2$), $SnSiO_3$, LiSnO, or $Mg_2Sn$.

Examples of the lithium-containing compound include a lithium transition metal composite oxide and a lithium transition metal phosphate compound. The definition regarding the lithium transition metal composite oxide and the lithium transition metal phosphate compound is as described above or the same. Specifically, examples of the lithium transition metal composite oxide and the lithium transition metal phosphate compound include $Li_3V_2(PO_4)_3$, $Li_3Fe_2(PO_4)_3$, and $Li_4Ti_5O_{12}$.

Examples of the negative electrode active material capable of occluding and releasing sodium ions include at least one selected from the group consisting of a sodium-containing phosphate compound having a NASICON-type structure, a sodium-containing phosphate compound having an olivine-type structure, and a sodium-containing oxide having a spinel-type structure.

The positive electrode layer and/or the negative electrode layer may contain an electron conductive material. Examples of the electron conductive material that can be contained in the positive electrode layer and/or the negative electrode layer include a carbon material and a metal material. Specifically, the carbon material is, for example, graphite, or carbon nanotube. The metal material is, for example, copper (Cu), magnesium (Mg), titanium (Ti), iron (Fe), cobalt (Co), nickel (Ni), zinc (Zn), aluminum (Al), germanium (Ge), indium (In), gold (Au), platinum (Pt), silver (Ag), or palladium (Pd), and may be an alloy of two or more thereof.

The positive electrode layer and/or the negative electrode layer may contain a binder. The binder is, for example, any one or more of synthetic rubber, polymer material, and the like. Specifically, the synthetic rubber is, for example, styrene butadiene-based rubber, fluorine-based rubber, ethylene propylene diene, or the like. Examples of the polymer material include at least one selected from the group consisting of polyvinylidene fluoride, polyimide, and an acrylic resin.

Further, the positive electrode layer and/or the negative electrode layer may contain a sintering aid. Examples of the sintering aid include at least one selected from the group consisting of lithium oxide, sodium oxide, potassium oxide, boron oxide, silicon oxide, bismuth oxide, and phosphorus oxide.

The thicknesses of the positive electrode layer and the negative electrode layer are not particularly limited, and may be, for example, 2 μm to 100 μm, particularly 5 μm to 50 μm, independently of each other.

(Solid Electrolyte)

The solid electrolyte is, for example, a material capable of conducting lithium ions, sodium ions, and the like as ions. In particular, the solid electrolyte constituting a battery constituent unit in the solid-state battery forms a layer through which, for example, lithium ions can conduct between the positive electrode layer and the negative electrode layer. The solid electrolyte may be provided at least between the positive electrode layer and the negative electrode layer. That is, the solid electrolyte may also exist around the positive electrode layer and/or the negative electrode layer so as to protrude from between the positive electrode layer and the negative electrode layer. Specific examples of the solid electrolyte include any one or more of crystalline solid electrolytes, glass ceramic-based solid electrolytes, and the like.

The crystalline solid electrolyte is a crystalline electrolyte. Specifically, the crystalline solid electrolyte is, for example, an inorganic material or a polymer material, and the inorganic material is, for example, sulfide, oxide, or phosphate. Examples of the sulfide include $Li_2S$—$P_2S_5$, $Li_2S$—$SiS_2$—$Li_3PO_4$, $Li_7P_3S_{11}$, $Li_{3.25}Ge_{0.25}P_{0.75}S$, and $Li_{10}GeP_2S_{12}$. Examples of the oxide or phosphorus oxide include $Li_xM_y(PO_4)_3$ ($1\leq x\leq 2$, $1\leq y\leq 2$, and M is at least one selected from the group consisting of Ti, Ge, Al, Ga, and Zr), $Li_7La_3Zr_2O_{12}$, $Li_{6.75}La_3Zr_{1.75}Nb_{0.25}O_{12}$, $Li_6BaLa_2Ta_2O_{12}$, $Li_{1+x}Al_xTi_{2-x}(PO_4)_3$, $La_{2/3-x}Li_{3x}TiO_3$, $Li_{1.2}Al_{0.2}Ti_{1.8}(PO_4)_3$, $La_{0.55}Li_{0.35}TiO_3$, and $Li_7La_3Zr_2O_{12}$. The polymer material is, for example, polyethylene oxide (PEO).

The glass ceramic-based solid electrolyte is an electrolyte in which amorphous and crystalline are mixed. The glass ceramic-based solid electrolyte is, for example, an oxide containing lithium (Li), silicon (Si), and boron (B) as constituent elements, and more specifically contains lithium oxide ($Li_2O$), silicon oxide ($SiO_2$), boron oxide ($B_2O_3$), and the like. The ratio of the content of lithium oxide to the total content of lithium oxide, silicon oxide, and boron oxide is not particularly limited, and is, for example, 40 mol % to 73 mol %. The ratio of the content of silicon oxide to the total content of lithium oxide, silicon oxide, and boron oxide is not particularly limited, and is, for example, 8 mol % to 40 mol %. The ratio of the content of boron oxide to the total content of lithium oxide, silicon oxide, and boron oxide is not particularly limited, and is, for example, 10 mol % to 50 mol %. In order to measure the content of each of lithium oxide, silicon oxide, and boron oxide, a glass ceramic-based solid electrolyte is analyzed using, for example, inductively coupled plasma atomic emission spectrometry (ICP-AES) or the like.

Examples of the solid electrolyte capable of conducting sodium ions include a sodium-containing phosphate compound having a NASICON structure, an oxide having a perovskite structure, and an oxide having a garnet-type structure or a garnet-type similar structure. Examples of the sodium-containing phosphate compound having a NASICON structure include $Na_xM_y(PO_4)_3$ ($1 \leq x \leq 2$, $1 \leq y \leq 2$, and M is at least one selected from the group consisting of Ti, Ge, Al, Ga, and Zr).

The solid electrolyte layer may contain a binder and/or a sintering aid. The binder and/or the sintering aid that can be contained in the solid electrolyte layer may be selected from, for example, materials similar to the binder and/or the sintering aid that can be contained in the positive electrode layer and/or the negative electrode layer.

The thickness of the solid electrolyte layer is not particularly limited, and may be, for example, 1 μm to 15 μm, particularly 1 μm to 5 μm.

(Positive Electrode Current Collecting Layer/Negative Electrode Current Collecting Layer)

As a positive electrode current collecting material constituting the positive electrode current collecting layer and a negative electrode current collecting material constituting the negative electrode current collecting layer, it is preferable to use a material having a high electrical conductivity, and for example, it is preferable to use at least one selected from the group consisting of a carbon material, silver, palladium, gold, platinum, aluminum, copper, and nickel. Each of the positive electrode current collecting layer and the negative electrode current collecting layer may have an electrical connection portion for being electrically connected to the outside, and may be configured to be electrically connectable to the terminal. Each of the positive electrode current collecting layer and the negative electrode current collecting layer may have a form of a foil, but it is preferable to have a form of being sintered integrally with each other from the viewpoint of improving electron conductivity by integral sintering and reducing manufacturing cost. When the positive electrode current collecting layer and the negative electrode current collecting layer have a form of a sintered body, for example, the positive electrode current collecting layer and the negative electrode current collecting layer may be formed of a sintered body containing an electron conductive material, a binder and/or a sintering aid. The electron conductive material that can be contained in the positive electrode current collecting layer and the negative electrode current collecting layer may be selected from, for example, materials similar to the electron conductive material that can be contained in the positive electrode layer and/or the negative electrode layer. The binder and/or the sintering aid that can be contained in the positive electrode current collecting layer and the negative electrode current collecting layer may be selected from, for example, materials similar to the binder and/or the sintering aid that can be contained in the positive electrode layer and/or the negative electrode layer.

The thicknesses of the positive electrode current collecting layer and the negative electrode current collecting layer are not particularly limited, and may be, for example, 1 μm to 10 μm, particularly 1 μm to 5 μm, independently of each other.

(Insulating Layer)

The insulating layer refers to a layer that can be formed of a material that does not conduct electricity, that is, a non-conductive material (insulating material). Although not particularly limited, the insulating layer may be formed of, for example, a glass material, a ceramic material, or the like. For example, a glass material may be selected as the insulating layer. Although not particularly limited, examples of the glass material include at least one selected from the group consisting of soda lime glass, potash glass, borate glass, borosilicate glass, barium borosilicate glass, borite glass, barium borate glass, bismuth silicate glass, bismuth zinc borate glass, bismuth silicate glass, phosphate glass, aluminophosphate glass, and phosphite glass. Although not particularly limited, examples of the ceramic material include at least one selected from the group consisting of aluminum oxide ($Al_2O_3$), boron nitride (BN), silicon dioxide ($SiO_2$), silicon nitride ($Si_3N_4$), zirconium oxide ($ZrO_2$), aluminum nitride (AlN), silicon carbide (SiC), and barium titanate ($BaTiO_3$).

(Electrode Separation Portion)

An electrode separation portion (also referred to as a "margin layer") refers to a portion that can separate the positive electrode layer from the negative electrode terminal by being disposed around the positive electrode layer. The electrode separation portion refers to a portion that can separate the negative electrode layer from the positive electrode terminal by being disposed around the negative electrode layer. Although not particularly limited, the electrode separation portion is preferably formed of, for example, a solid electrolyte, an insulating material, or the like. The solid electrolyte, the insulating material, or the like may be used.

(Protective Layer)

A protective layer may be generally formed on the outermost side of the solid-state battery, and is for electrically, physically, and/or chemically protecting the solid-state battery, particularly for protecting the solid-state battery laminate. As a material that can form the protective layer, it is preferable that the material is excellent in insulation property, durability and/or moisture resistance, and is environmentally safe. For example, it is preferable to use glass, ceramics, a thermosetting resin, and/or a photocurable resin.

(Terminal)

The solid-state battery may generally be provided with a terminal (external terminal). In particular, the terminals of the positive and negative electrodes may be provided to form a pair on the side surface of the solid-state battery.

More specifically, a terminal on the positive electrode side connected to the positive electrode layer and a terminal on the negative electrode side connected to the negative electrode layer may be provided so as to form a pair. As such a terminal, it is preferable to use a material having high conductivity. The material of the terminal is not particularly limited, and may be at least one selected from the group consisting of silver, gold, platinum, aluminum, copper, tin, and nickel.

Features of Solid-State Battery of Present Invention

A solid-state battery according to an embodiment of the present invention is a solid-state battery including a solid-state battery laminate having at least one battery constituent unit including a positive electrode layer, a negative electrode layer, and a solid electrolyte layer interposed between the positive electrode layer and the negative electrode layer along a stacking direction, and is characterized in terms of an active material amount at a terminal contact portion of an electrode layer (that is, the positive electrode layer and the negative electrode layer).

More specifically, the positive electrode layer and the negative electrode layer include a terminal contact portion in direct contact with the positive electrode terminal and the negative electrode terminal, respectively, and a non-terminal contact portion other than the terminal contact portion, and the terminal contact portion in at least one electrode layer has a relatively small active material amount with respect to the non-terminal contact portion.

The term "terminal contact portion" used in the present specification refers to, for example, a portion where at least the opposite electrode layers facing each other in the stacking direction do not exist. The "non-terminal contact portion" refers to a portion other than the terminal contact portion in the electrode layer. That is, one electrode layer includes one terminal contact portion and one non-terminal contact portion. For example, as illustrated in FIG. 3A, the positive electrode layer 10A includes a positive electrode terminal contact portion 11A and a positive electrode non-terminal contact portion 12A, and the negative electrode layer 10B includes a negative electrode terminal contact portion 11B and a negative electrode non-terminal contact portion 12B. Here, the positive electrode terminal contact portion 11A has a portion where at least the negative electrode layer 10B facing in the stacking direction does not exist, and the negative electrode terminal contact portion 11B has a portion where the positive electrode layer 10A facing in the stacking direction does not exist. In the sectional view, the ratio (L1/L2) of a terminal contact portion length (L1) to an electrode layer length (L2) is 0.01 to 0.5. The above ratio (L1/L2) may be the same or different between the positive electrode and the negative electrode.

As used in the present specification, "the terminal contact portion has a relatively small active material amount with respect to the non-terminal contact portion" means that, for example, the active material density of the terminal contact portion is smaller than the active material density of the non-terminal contact portion. The active material density substantially means a value obtained by dividing the mass of the active material contained in the terminal contact portion or the non-terminal contact portion by the volume of the portion.

As described above, from the viewpoint that the "terminal contact portion" is a portion having a relatively small active material amount in one electrode layer, the "terminal contact portion" may refer to a portion having a different structure and/or composition from other portions in one electrode layer.

In the solid-state battery of the present invention, the terminal contact portion of at least one electrode layer has a relatively small active material amount with respect to the non-terminal contact portion, thereby providing a more desirable solid-state battery in terms of charge-discharge reaction. In particular, ions diffusing into the non-opposing region in the electrode layer in the vicinity of the terminal are reduced, so that the balance of the charge-discharge reaction in the electrode layer is improved (refer to FIG. 2B). Therefore, the charge-discharge efficiency can be improved, and the energy density of the battery can be increased. In other words, battery deterioration is suppressed from a long-term viewpoint due to such a desired discharge, and as a result, a solid-state battery with improved long-term reliability can be provided.

In the exemplary aspect illustrated in FIG. 3A, in a sectional view of solid-state battery laminate 500', a positive electrode layer 10A, a solid electrolyte layer 20, and a negative electrode layer 10B are provided in this order. The solid-state battery laminate 500' is provided with a positive electrode terminal 40A and a negative electrode terminal 40B so as to be in contact with two facing side surfaces (that is, a positive electrode side end surface 500'A and a negative electrode side end surface 500'B).

The positive electrode layer 10A and the negative electrode layer 10B extend so as to terminate at the positive electrode side end surface 500'A and the negative electrode side end surface 500'B, respectively. The positive electrode layer 10A includes the positive electrode terminal contact portion 11A which is a portion terminating at the positive electrode side end surface 500'A and the positive electrode non-terminal contact portion 12A which is a portion other than the positive electrode terminal contact portion 11A. In addition, the negative electrode layer 10B includes the negative electrode terminal contact portion 11B which is a portion terminating at the negative electrode side end surface 500'B and the negative electrode non-terminal contact portion 12B which is a portion other than the negative electrode terminal contact portion 11B. Here, the positive electrode terminal contact portion 11A and the negative electrode terminal contact portion 11B are electrically connected to the positive electrode terminal 40A and the negative electrode terminal 40B, respectively.

The positive electrode layer 10A is formed so as not to terminate at the negative electrode side end surface 500'B, and the negative electrode layer 10B is formed so as not to terminate at the positive electrode side end surface 500'A. A positive electrode separation portion 30A is provided between the positive electrode layer 10A and the negative electrode side end surface 500'B. Further, a negative electrode separation portion 30B is provided between the negative electrode layer 10B and the positive electrode side end surface 500'A.

In the stacking direction of the solid-state battery 500, the positive electrode terminal contact portion 11A faces the negative electrode separation portion 30B, and the negative electrode terminal contact portion 11B faces the positive electrode separation portion 30A. That is, each of the positive electrode terminal contact portion 11A and the negative electrode terminal contact portion 11B has a portion where the electrode layers do not face each other in the stacking direction. Here, the positive electrode terminal contact portion 11A has a relatively small active material amount with respect to the positive electrode non-terminal contact portion 12A, and the negative electrode terminal contact portion 11B has a relatively small active material amount with respect to the negative electrode non-terminal contact portion 12B.

With the above-described configuration, ions diffusing into the non-opposing region in the electrode layer in the vicinity of the terminal can be reduced. That is, the ion loss in the charge-discharge reaction can be reduced, and the reaction distribution in the electrode layer can be made more uniform. As described above, from the viewpoint that the "terminal contact portion" is a portion having a relatively small active material amount in one electrode layer, the "terminal contact portion" may refer to a portion having a different structure and/or composition from other portions in one electrode layer.

Figure 3B:
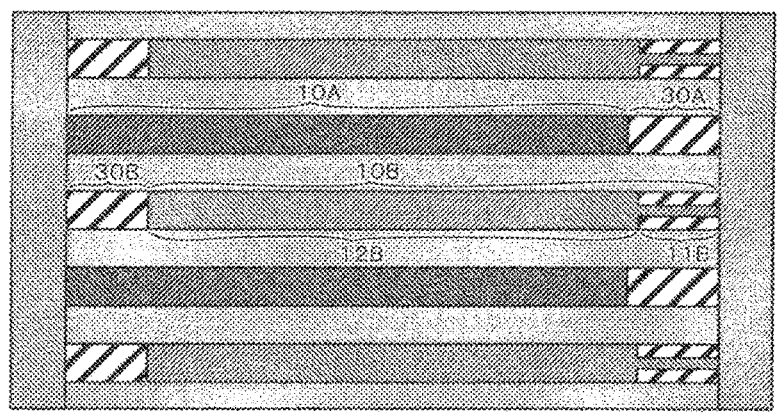
Figure 3C:
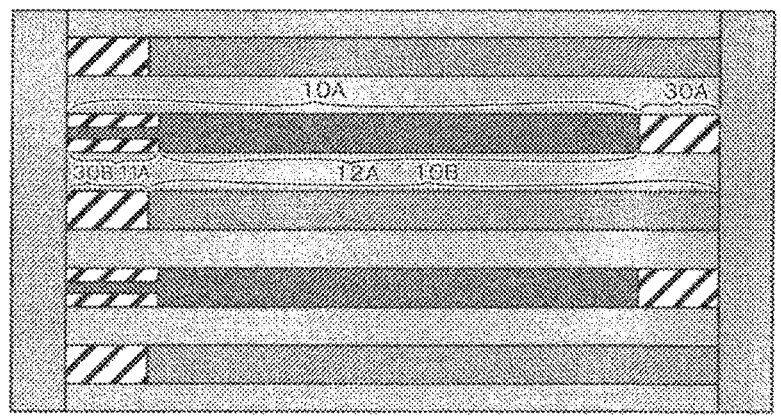

In a preferred aspect, only the negative electrode terminal contact portion 11B has a relatively small active material amount with respect to the negative electrode non-terminal contact portion 12B (refer to FIG. 3B). In another preferred aspect, only the positive electrode terminal contact portion 11A has a relatively small active material amount with respect to the positive electrode non-terminal contact portion 12A (refer to FIG. 3C).

In a more preferred aspect, as in the configuration of FIG. 3A described above, the positive electrode terminal contact portion 11A and the negative electrode terminal contact portion 11B respectively have a relatively small active material amount with respect to the positive electrode non-terminal contact portion 12A and the negative electrode non-terminal contact portion 12B. With such a configuration, ion loss in charge-discharge reactions in both electrode layers can be reduced, and the reaction distribution in the electrode layers can be made more uniform. In addition, in a sectional view of solid-state battery laminate 500, a configuration of the solid-state battery laminate 500 can have a symmetrical shape, and structural stability can be further enhanced.

Figure 5A:
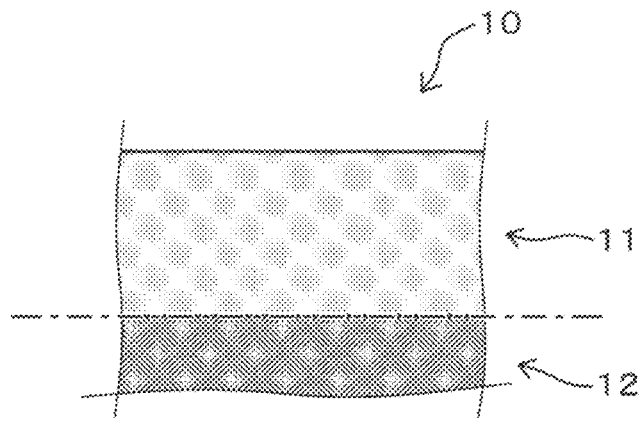
FIG. 5A to FIG. 5D are plan views schematically illustrating a terminal contact portion having a relatively small active material amount in an electrode layer of the solid-state battery according to the embodiment of the present invention.

In a preferred aspect, as in the exemplary aspect illustrated in FIG. 4A and FIG. 5A, the terminal contact portion 11 in the electrode layer 10 is made of an electrode material which is the same kind as the electrode material forming the non-terminal contact portion 12 and has a smaller active material density than the electrode material forming the non-terminal contact portion 12. When the same type of electrode material as the electrode material forming the non-terminal contact portion is used for the terminal contact portion, adhesion between materials of the terminal contact portion and the non-terminal contact portion can be enhanced, and peeling or the like between materials can be more effectively prevented.

Figure 5B:
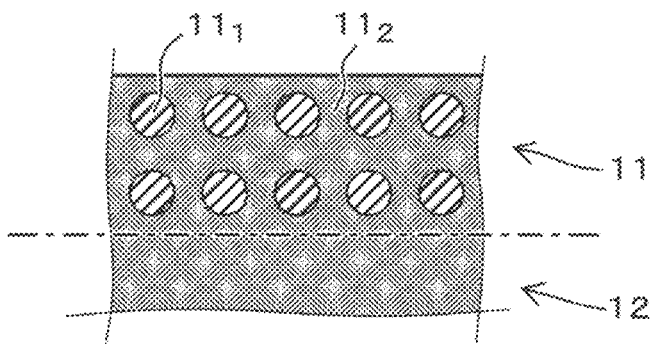

In a preferred aspect, the terminal contact portion includes a first region including an insulating material and a second region not including the insulating material. As in the exemplary aspect illustrated in FIG. 4B and FIG. 5B, in the terminal contact portion 11 of the electrode layer 10, the plurality of first regions $11_1$ including the insulating material is preferably uniformly or non-uniformly distributed in the second region $11_2$ not including the insulating material. With such a configuration, the strength of the terminal contact portion where stress is likely to occur can be further increased, and the occurrence of cracking, peeling, and the like of the terminal contact portion can be suitably suppressed.

In a preferred aspect, in a sectional view of the solid-state battery laminate, the first region and the second region are stacked on each other. That is, in a sectional view of the terminal contact portion 11 in the electrode layer 10, the first region $11_1$ and the second region $11_2$ are stacked on each other (refer to FIG. 4C to FIG. 4E). From the viewpoint of reduction of ion loss and structural stability, it is preferable that the first region $11_1$ is provided at least on the side where the opposite electrode layers facing each other in the stacking direction exist in the electrode layer (for example, the downward direction side of the negative electrode layer 10B located in the uppermost direction in FIG. 3A) (refer to FIG. 4C). In addition, it is more preferable that the first region $11_1$ is provided in the outermost portion of the terminal contact portion 11 in the stacking direction, and specifically, it is more preferable that the second region $11_2$ including the positive electrode active material is interposed between the two first regions $11_1$ (refer to FIG. 4D).

With the above-described configuration, when the second region $11_2$ contains the active material, the first region $11_1$ exists on the side where the opposite electrode layers facing each other in the stacking direction do not exist in the second region $11_2$, so that ions diffusing into the non-opposing region in the electrode layer in the vicinity of the terminal can be more effectively reduced. In such a configuration, when the second region $11_2$ contains an electron conductive material, it is more preferable that the number of stacked layers of the first region $11_1$ and the second region $11_2$ is large so as to make the electron conduction distance between the second region $11_2$ and the terminal uniform (refer to FIG. 4E).

In a further preferred aspect, in a sectional view of the solid-state battery laminate, the thickness dimension of the second region is smaller than the thickness dimension of the non-terminal contact portion. That is, the thickness dimension of the second region $11_2$ is smaller than the thickness dimension of the non-terminal contact portion 12 so as to relatively reduce the active material amount of the terminal contact portion 11 (refer to FIG. 4C to FIG. 4E). With such a configuration, the active material amount of each electrode terminal contact portion can be easily adjusted so as to be relatively small with respect to each electrode non-terminal contact portion. Therefore, ion loss in the charge-discharge reactions in both electrode layers can be more effectively reduced, and the reaction distribution in the electrode layers can be made more uniform.

Figure 5C:
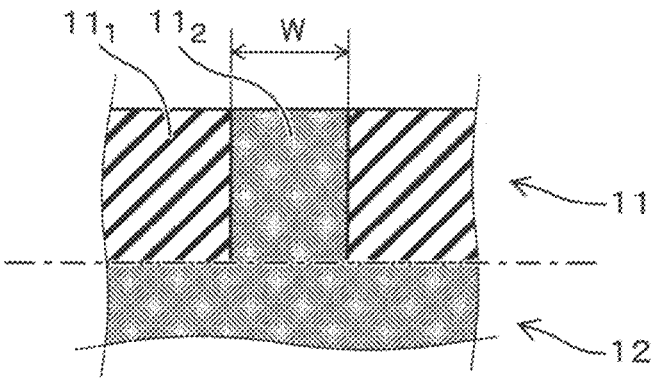
Figure 5D:
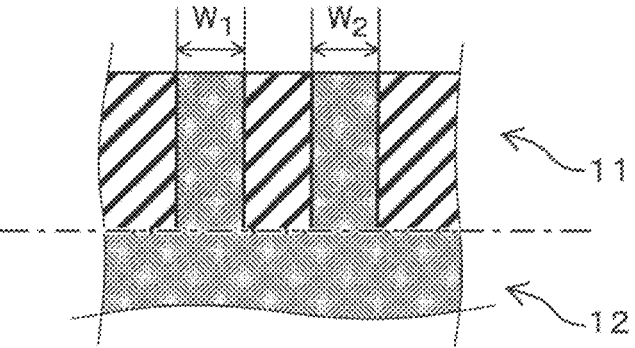

In another preferred aspect, the solid-state battery laminate has a configuration in which the first region and the second region are adjacent to each other in a plan view. That is, in a plan view of the terminal contact portion 11 in the electrode layer 10, the first region $11_1$ and the second region $11_2$ are adjacent to each other (refer to FIG. 5C and FIG. 5D). From the viewpoint of structural stability, it is more preferable that the first regions $11_1$ are provided at both ends of the terminal contact portion 11 in the width direction. Specifically, it is more preferable that the second region $11_2$ including the positive electrode active material is interposed between the two first regions $11_1$ (refer to FIG. 5C).

With the above-described configuration, when the second region $11_2$ contains the active material, the area of the portion (that is, the second region $11_2$) containing the active material facing the non-opposing region of the electrode layer can be reduced, so that ions diffusing into the non-opposing region between the electrode layers in the vicinity of the terminal can be more effectively reduced. In such a configuration, when the second region $11_2$ contains an electron conductive material, it is more preferable that the number of the first region $11_1$ and the second region $11_2$ which are adjacent to each other is large so as to make the electron conduction distance between the second region $11_2$ and the terminal uniform (refer to FIG. 5D).

In a further preferred aspect, in a plan view of the solid-state battery laminate, the width dimension of the second region is smaller than the width dimension of the non-terminal contact portion. For example, the width dimension of the second region $11_2$ is smaller than the width dimension of the non-terminal contact portion 12 so as to relatively reduce the active material amount of the terminal contact portion 11 (refer to FIG. 5C and FIG. 5D). With such a configuration, the active material amount of each electrode terminal contact portion can be easily adjusted so as to be relatively small with respect to each electrode non-terminal contact portion. Therefore, ion loss in the charge-discharge reactions in both electrode layers can be more effectively reduced, and the reaction distribution in the electrode layers can be made more uniform.

In the present specification, the "thickness dimension of the second region" refers to "T" in FIG. 4C and FIG. 4D in the illustrated exemplary aspect, and when a plurality of second regions are stacked as in FIG. 4E, the "thickness dimension of the second region" refers to the total thickness dimension of the plurality of second regions (that is, it refers to the sum of "$T_1$" and "$T_2$" in FIG. 4E). In addition, the "width dimension of the second region" refers to "W" in FIG. 5C in the illustrated exemplary aspect, and when a plurality of second regions are exist as in FIG. 5D, the "width dimension of the second region" refers to the total thickness dimension of the plurality of second regions (that is, it refers to the sum of "$W_1$" and "$W_2$" in FIG. 5D).

In a preferred aspect, the first region is preferably an insulating material including a glass material and/or a ceramic material. In addition, it is preferable that the first region has a relatively smaller active material amount than the non-terminal contact portion or does not have the active material. With such a configuration, high strength can be provided to the terminal contact portion, and the structural stability of the solid-state battery can be further enhanced. In addition, in the stacking direction of the solid-state battery, the active material amount of the terminal contact portion, which is the region where the electrode layers do not face each other, can be reduced, and the balance of the charge-discharge reaction between the electrode layers in the vicinity of the terminal can be further improved.

In a preferred aspect, the second region and the non-terminal contact portion are formed of the same material. In other words, the second region and the non-terminal contact portion are integrated with each other. When the second region and the non-terminal contact portion are formed of the same material, adhesion between the materials of the second region and the non-terminal contact portion can be enhanced, and peeling or the like between the materials can be more effectively prevented.

The second region of the electrode layer of any one of the positive electrode layer and the negative electrode layer may include a current collecting layer. With such a configuration, although in a case where the electron conductivity of the electrode material forming the electrode layer is low, the electron conductivity between the electrode layer and the terminal can be secured.

Figure 6:
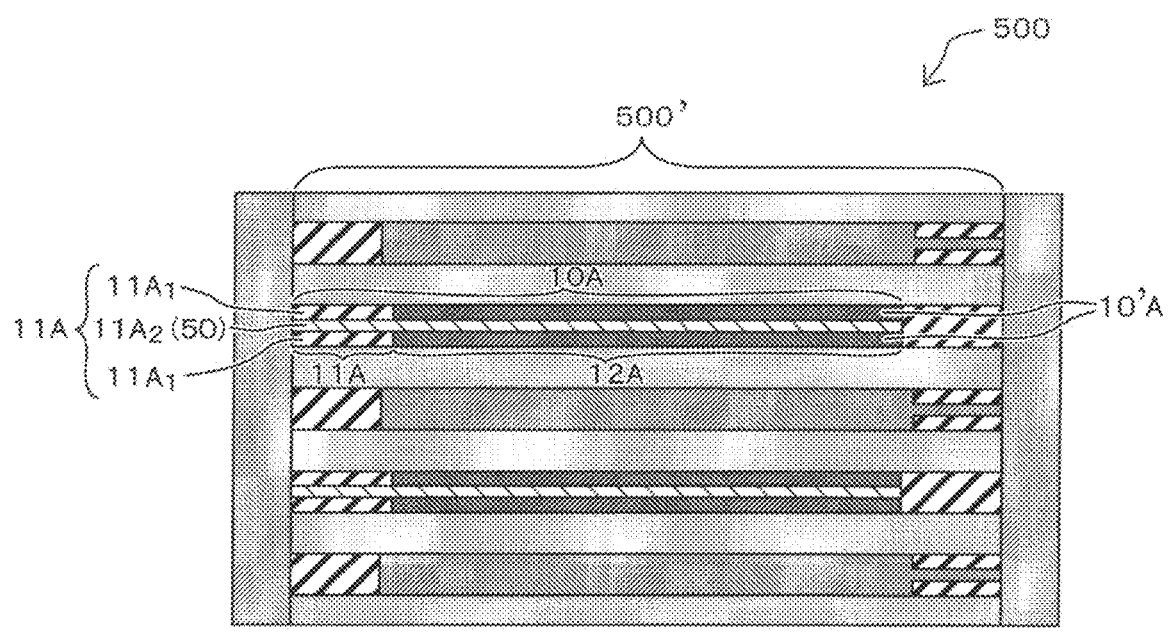
FIG. 6 is a sectional view schematically illustrating the solid-state battery including a current collecting layer in a positive electrode layer according to the embodiment of the present invention.

In a preferred aspect, as in the exemplary aspect illustrated in FIG. 6, in the stacking direction of the positive electrode layer 10A, the current collecting layer 50 is interposed between two positive electrode active material layers 10'A at the positive electrode non-terminal contact portion 12A, and only the current collecting layer 50 extends so as to be in contact with the positive electrode terminal contact portion 11A. In the positive electrode terminal contact portion 11A, an insulating material is provided around the current collecting layer 50. That is, in a sectional view of the terminal contact portion 11A in the positive electrode layer 10A, the first region $11A_1$ formed of an insulating material and the second region $11A_2$ formed of the current collecting layer 50 are stacked on each other.

Figure 7:
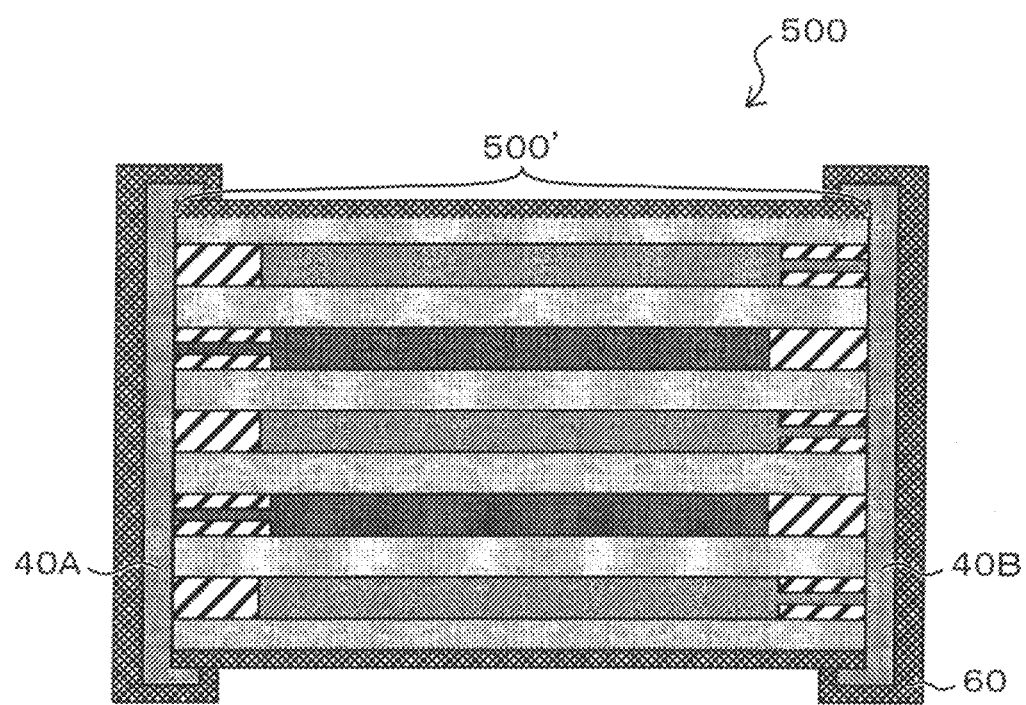
FIG. 7 is a sectional view schematically illustrating the solid-state battery including a protective layer according to the embodiment of the present invention.

In a preferred aspect, the solid-state battery may further include a protective layer. As illustrated in FIG. 7, a protective layer 60 may be provided outside the solid-state battery laminate 500', the positive electrode terminal 40A, and the negative electrode terminal 40B so as to be integrated therewith.

In a preferred aspect, a density ratio of the active material of the terminal contact portion to the non-terminal contact portion is 0.1 to 0.5. When the density ratio is 0.1 or more, the adhesion between the second region and the non-terminal contact portion can be more effectively enhanced, and when the density ratio is 0.5 or less, the balance of the charge-discharge reaction between the electrode layers in the vicinity of the terminal can be more effectively improved. The density ratio is preferably 0.2 to 0.45, and more preferably 0.3 to 0.4.

The density ratio as described above can be adjusted by, for example, the dimension of the second region $11_2$ in a sectional view and/or a plan view of the terminal contact portion 11 (refer to FIG. 4C to FIG. 4E, FIG. 5C and FIG. 5D). That is, the thickness dimension and/or the width dimension of the second region $11_2$ in the sectional view and/or the plan view of the terminal contact portion 11 may be adjusted by being configured to have a dimension ratio of 0.1 to 0.5 with respect to the thickness dimension and/or the width dimension of the non-terminal contact portion.

In the solid-state battery of the present specification, the structure in which the terminal contact portion has a relatively small active material amount with respect to the non-terminal contact portion may be a structure in which a cross section in a sectional view direction is cut out by an ion milling apparatus (model number IM 4000 PLUS manufactured by Hitachi High-Technologies Corporation) and observed from an image acquired using a scanning electron microscope (SEM) (model number SU-8040 manufactured by Hitachi High-Technologies Corporation). In addition, the density ratio of the active material referred to in the present specification may refer to a value calculated from dimensions measured from an image acquired by the above-described method.

The solid-state battery according to the present invention is preferably a stacked solid-state battery formed by stacking layers constituting a battery constituent unit, and can be manufactured by a printing method such as a screen printing method, a green sheet method using a green sheet, or a composite method thereof. Therefore, each layer constituting the battery constituent unit may be formed of a sintered body. Preferably, each of the positive electrode layer, the negative electrode layer, and the solid electrolyte layer is integrally sintered with each other. That is, it can be said that the solid-state battery laminate forms an integrally fired product. In such an integrally fired product, the terminal contact portion of at least one electrode layer has a relatively small active material amount with respect to the non-terminal contact portion.

A more preferable aspect of the solid-state battery will be described. Taking the aspect illustrated in FIG. 3A as an example, in a sectional view of solid-state battery laminate 500', a positive electrode layer 10A, a solid electrolyte layer 20, and a negative electrode layer 10B are provided in this order. The solid-state battery laminate 500' is provided with the positive electrode terminal 40A and the negative electrode terminal 40B so as to be in contact with the positive electrode side end surface 500'A and the negative electrode side end surface 500'B.

The positive electrode layer 10A and the negative electrode layer 10B extend so as to terminate at the positive electrode side end surface 500'A and the negative electrode side end surface 500'B, respectively. The positive electrode layer 10A includes the positive electrode terminal contact portion 11A which is a portion terminating at the positive electrode side end surface 500'A and the positive electrode non-terminal contact portion 12A which is a portion other than the positive electrode terminal contact portion 11A. In addition, the negative electrode layer 10B includes the negative electrode terminal contact portion 11B which is a portion terminating at the negative electrode side end surface 500'B and the negative electrode non-terminal contact portion 12B which is a portion other than the negative electrode terminal contact portion 11B. Here, the positive electrode terminal contact portion 11A and the negative electrode terminal contact portion 11B are electrically connected to the positive electrode terminal 40A and the negative electrode terminal 40B, respectively.

The positive electrode layer 10A is formed so as not to terminate at the negative electrode side end surface 500'B, and the negative electrode layer 10B is formed so as not to terminate at the positive electrode side end surface 500'A. A positive electrode separation portion 30A is provided between the positive electrode layer 10A and the negative electrode side end surface 500'B. Further, a negative electrode separation portion 30B is provided between the negative electrode layer 10B and the positive electrode side end surface 500'A.

In the stacking direction of the solid-state battery laminate 500', the positive electrode terminal contact portion 11A faces the negative electrode separation portion 30B, and the negative electrode terminal contact portion 11B faces the positive electrode separation portion 30A. That is, the positive electrode terminal contact portion 11A and the negative electrode terminal contact portion 11B have a portion where the electrode layers do not face each other in the stacking direction. Here, the positive electrode terminal contact portion 11A has a relatively small active material amount with respect to the positive electrode non-terminal contact portion 12A, and the negative electrode terminal contact portion 11B has a relatively small active material amount with respect to the negative electrode non-terminal contact portion 12B.

In a sectional view of the positive electrode terminal contact portion 11A in the positive electrode layer 10A, the first region $11A_1$ formed of an insulating material and the second region $11A_2$ formed of the positive electrode active material layer (that is, the same material as the positive electrode non-terminal contact portion 12A) are stacked on each other. More specifically, the second region $11A_2$ formed of the positive electrode active material is interposed between the two first regions $11A_1$ made of the insulating material.

In addition, in a sectional view of the negative electrode terminal contact portion 11B in the negative electrode layer 10B, the first region $11B_1$ formed of an insulating material and the second region $11B_2$ formed of a negative electrode active material layer (that is, the same material as the negative electrode non-terminal contact portion 12B) are stacked on each other. More specifically, the second region $11B_2$ formed of the negative electrode active material is interposed between the two first regions $11B_1$ made of the insulating material.

Method for Manufacturing Solid-State Battery

As described above, the solid-state battery of the present invention is preferably a stacked solid-state battery formed by stacking layers constituting a battery constituent unit, and can be manufactured by a printing method such as a screen printing method, a green sheet method using a green sheet, or a composite method thereof. Hereinafter, a case where the printing method and the green sheet method are adopted for understanding the present invention will be described in detail, but the present invention is not limited to these methods.

(Step of Forming Solid-State Battery Laminate Precursor)

In this step, several types of pastes such as a paste for a positive electrode layer, a paste for a negative electrode layer, a paste for a solid electrolyte layer, a paste for a current collecting layer, a paste for an electrode separation portion (paste for a margin layer), a paste for a protective layer, and a paste for an insulating layer are used as inks. That is, a paste having a predetermined structure is formed or stacked on a support substrate by applying the paste by the printing method.

In the printing, a solid-state battery laminate precursor corresponding to a predetermined solid-state battery structure can be formed on a substrate by sequentially stacking printing layers with a predetermined thickness and pattern shape. The type of the pattern forming method is not particularly limited as long as it is a method capable of forming a predetermined pattern, and is, for example, any one or more of a screen printing method, a gravure printing method, and the like.

The paste can be prepared by wet-mixing a predetermined constituent material of each layer appropriately selected from the group consisting of a positive electrode active material, a negative electrode active material, an electron conductive material, a solid electrolyte material, a current collecting layer material, an insulating material, a binder, and a sintering aid, and an organic vehicle in which an organic material is dissolved in a solvent. The paste for a positive electrode layer contains, for example, a positive electrode active material, an electron conductive material, a solid electrolyte material, a binder, a sintering aid, an organic material, and a solvent. The paste for a negative electrode layer contains, for example, a negative electrode active material, an electron conductive material, a solid electrolyte material, a binder, a sintering aid, an organic material, and a solvent. The paste for a solid electrolyte layer contains, for example, a solid electrolyte material, a binder, a sintering aid, an organic material, and a solvent. The paste or a positive electrode current collecting layer and the paste for a negative electrode current collecting layer contain, for example, an electron conductive material, a binder, a sintering aid, an organic material, and a solvent. The paste for an electrode separation portion contains, for example, a solid electrolyte material, an insulating material, a binder, a sintering aid, an organic material, and a solvent. The paste for a protective layer contains, for example, an insulating material, a binder, an organic material, and a solvent. The paste for an insulating layer contains, for example, an insulating material, a binder, an organic material, and a solvent.

The organic material that can be contained in the paste is not particularly limited, and at least one polymer material selected from the group consisting of a polyvinyl acetal resin, a cellulose resin, a polyacrylic resin, a polyurethane resin, a polyvinyl acetate resin, a polyvinyl alcohol resin, and the like can be used. The kind of the solvent is not particularly limited, and is, for example, any one kind or two or more kinds among organic solvents such as butyl acetate, N-methyl-pyrrolidone, toluene, terpineol, and N-methyl-pyrrolidone.

In the wet mixing, a medium can be used, and specifically, a ball mill method, a viscomill method, or the like can be used. On the other hand, a wet mixing method without using a medium may be used, and a sandmill method, a high-pressure homogenizer method, or a kneader dispersion method can be used.

The support substrate is not particularly limited as long as it is a support capable of supporting each paste layer, and is, for example, a release film having one surface subjected to a release treatment. Specifically, a substrate formed of a polymer material such as polyethylene terephthalate can be used. When each paste layer is subjected to a firing step while being held on the substrate, a substrate having heat resistance to a firing temperature may be used as the substrate.

The applied paste is dried on a hot plate heated to 30° C. or higher and 50° C. or lower to form a positive electrode layer green sheet, a negative electrode layer green sheet, a solid electrolyte layer green sheet, a current collecting layer green sheet, an electrode separation portion green sheet, an insulating layer green sheet, and/or a protective layer green sheet having a predetermined shape and thickness on a substrate (for example, a PET film).

Next, each green sheet is peeled off from the substrate. After the peeling, the green sheets for the respective constituent elements of the battery constituent unit are sequentially stacked along the stacking direction to form a solid-state battery laminate precursor. After the stacking, the solid electrolyte layer, the electrode separation portion, the insulating layer and/or the protective layer may be provided to the side region of the electrode green sheet by screen printing.

(Firing Step)

In the firing step, the solid-state battery laminate precursor is subjected to firing. Although it is merely an example, the firing is performed by removing the organic material in a nitrogen gas atmosphere containing oxygen gas or in the atmosphere, for example, at 500° C., and then heating the organic material in a nitrogen gas atmosphere or in the atmosphere, for example, at 550° C. to 5000° C. The firing may be performed while pressurizing the solid-state battery laminate precursor in the stacking direction (in some cases, the stacking direction and a direction perpendicular to the stacking direction).

By undergoing such firing, a solid-state battery laminate is formed, and a desired solid-state battery is finally obtained.

(Regarding Preparation of Featured Portion in the Present Invention)

The terminal contact portion in the electrode layer of the solid-state battery of the present invention may be formed by any method as long as the terminal contact portion has a relatively small active material amount with respect to the non-terminal contact portion. For example, a raw material paste may be prepared such that a mixing ratio of the active material amount of the terminal contact portion to the active material amount of the non-terminal contact portion is reduced in terms of the content of the active material amount.

In addition, for example, printed layers of a plurality of raw material pastes having different active material contents may be sequentially stacked with a predetermined thickness and a pattern shape, and the electrode layer green sheet may be prepared so that the terminal contact portion has a relatively small active material amount with respect to the non-terminal contact portion. Specifically, a predetermined electrode layer green sheet may be prepared by adjusting the active material amount and/or the number of times of application of the raw material paste in each printing layer to be stacked.

Figure 8A:
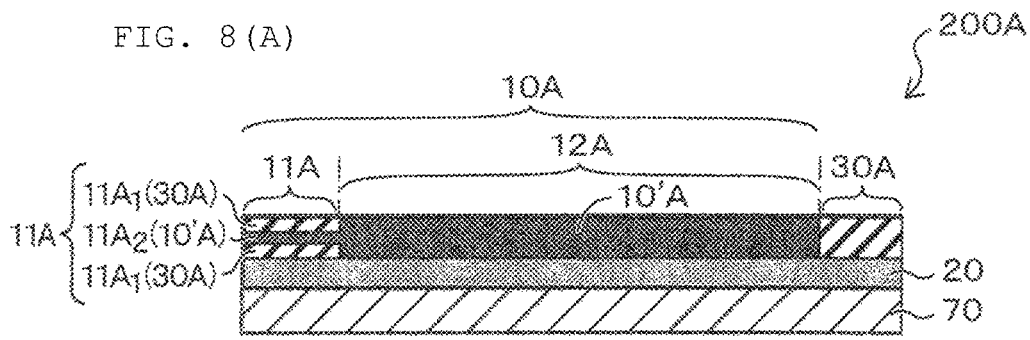
FIG. 8A to FIG. 8C are sectional views schematically illustrating a method for manufacturing a solid-state battery according to an embodiment of the present invention.

Hereinafter, a method for manufacturing a solid-state battery will be specifically described based on exemplary aspects illustrated in FIG. 8A to FIG. 8C.

In order to manufacture the solid-state battery, for example, as described below, a step of forming a positive electrode layer green sheet 200A, a step of forming a negative electrode layer green sheet 200B, a step of forming a solid-state battery laminate 500', and a step of forming each of the positive electrode terminal 40A and the negative electrode terminal 40B are performed.

Step of Forming Positive Electrode Layer Green Sheet

First, a solid electrolyte, a solvent, and, if necessary, an electrolyte binder or the like are mixed to prepare a paste for a solid electrolyte layer. Subsequently, as illustrated in FIG. 8A, the paste for a solid electrolyte layer is applied to one surface of a substrate 70 to form the solid electrolyte layer 20.

Subsequently, an insulating material, a solvent, and an electrode separation binder or the like as necessary are mixed to prepare a paste for an electrode separation portion. Subsequently, two positive electrode separation portions 30A are formed by applying the paste for an electrode separation portion to both end portions of the surface of the solid electrolyte layer 20 using a pattern forming method. At this time, one positive electrode separation portion 30A is formed to be thinner than the other positive electrode separation portion 30A.

Subsequently, a positive electrode active material, a solvent, and if necessary, a positive electrode active material binder and the like are mixed to prepare a paste for a positive electrode layer. Subsequently, the positive electrode active material layer 10'A is formed by applying the paste for a positive electrode layer to the surfaces of the solid electrolyte layer 20 and the thinned positive electrode separation portion 30A using a pattern forming method. At this time, the surface portion of the positive electrode separation portion 30A is thinly applied to form the positive electrode active material layer 10'A such that the end portion becomes a recessed portion.

Finally, the paste for an electrode separation portion is applied to the recessed portion of the surface of the positive electrode active material layer 10'A to form the positive electrode separation portion 30A, thereby forming the positive electrode layer 10A. As a result, the positive electrode layer 10A formed of the positive electrode terminal contact portion 11A and the positive electrode non-terminal contact portion 12A is formed. The positive electrode terminal contact portion 11A has a configuration in which the second region $11A_2$ (positive electrode active material layer 10'A) is stacked so as to be interposed between the two first regions $11A_1$ (positive electrode separation portion 30A), and the positive electrode non-terminal contact portion 12A has a configuration including only the positive electrode active material layer 10'A. Therefore, since the positive electrode layer 10A and the positive electrode separation portion 30A are formed so as to be disposed in the same layer, the positive electrode layer green sheet 200A including the positive electrode layer 10A, the solid electrolyte layer 20, and the positive electrode separation portion 30A is obtained.

Step of Forming Negative Electrode Layer Green Sheet

Figure 8B:
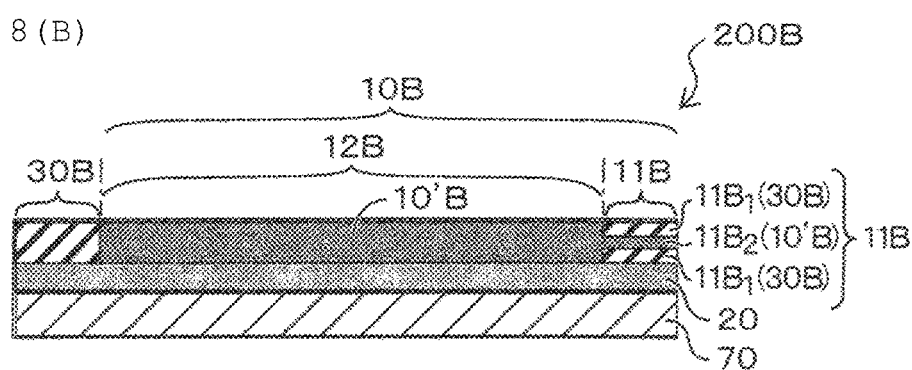
Figure 8C:
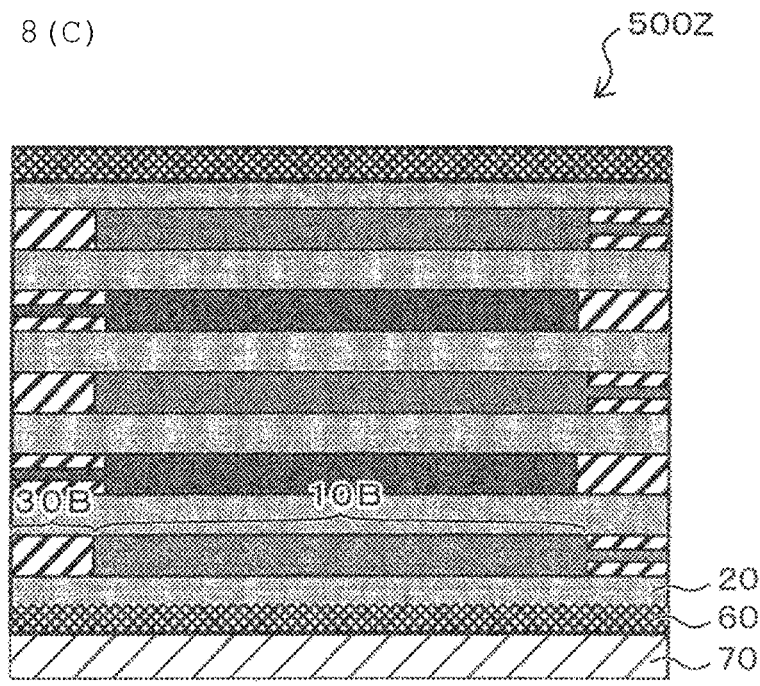

First, as illustrated in FIG. 8B, the solid electrolyte layer 20 is formed on one surface of the substrate 70 by the procedure described above.

Subsequently, the paste for an electrode separation portion is prepared by the same procedure as the preparation procedure of the paste for an electrode separation portion described above. Subsequently, two negative electrode separation portions 30B are formed by applying the paste for an electrode separation portion to both end portions of the surface of the solid electrolyte layer 20 using a pattern forming method. At this time, one negative electrode separation portion 30B is formed to be thinner than the other negative electrode separation portion 30B.

Subsequently, a negative electrode active material, a solvent, and if necessary, a negative electrode active material binder and the like are mixed to prepare a paste for a negative electrode layer. Subsequently, a negative electrode active material layer 10'B is formed by applying the paste for a negative electrode layer to the surfaces of the solid electrolyte layer 20 and the thinned negative electrode separation portion 30B using a pattern forming method. At this time, the surface portion of the negative electrode separation portion 30B is thinly applied to form the negative electrode active material layer 10'B such that the end portion becomes a recessed portion.

Finally, the paste for an electrode separation portion is applied to the recessed portion of the surface of the negative electrode active material layer 10'B to form the negative electrode separation portion 30B, thereby forming the negative electrode layer 10B. As a result, the negative electrode layer 10B formed of the negative electrode terminal contact portion 11B and the negative electrode non-terminal contact portion 12B is formed. The negative electrode terminal contact portion 11B has a configuration in which the second region $11B_2$ (negative electrode active material layer 10'B) is stacked so as to be interposed between the two first regions $11B_1$ (negative electrode separation portion 30B), and the negative electrode non-terminal contact portion 12B has a configuration including only the negative electrode active material layer 10'B. Therefore, since the negative electrode layer 10B and the negative electrode separation portion 30B are formed so as to be disposed in the same layer, the negative electrode layer green sheet 200B including the negative electrode layer 10B, the solid electrolyte layer 20, and the negative electrode separation portion 30B is obtained.

Step of Forming Solid-State Battery Laminate

First, a protective solid electrolyte, a solvent, and, if necessary, a protective binder or the like are mixed to prepare a paste for a protective layer. Alternatively, a protective solid electrolyte, a solvent, an insulating material, and, if necessary, a protective binder or the like are mixed to prepare a paste for a protective layer. Subsequently, as illustrated in FIG. 8C, the paste for a protective layer is applied to one surface of a substrate 70 to form the protective layer 60.

Subsequently, the paste for a solid electrolyte layer is applied to the surface of the protective layer 60 to form the solid electrolyte layer 20. Subsequently, the negative electrode separation portion 30B is formed by applying the paste for an electrode separation portion to one of the end portions of the surface of the solid electrolyte layer 20 using a pattern forming method. Subsequently, the negative electrode layer 10B is formed on the surface of the solid electrolyte layer 20 by the same method as the above-described negative electrode layer green sheet so as to be disposed in the same layer as the negative electrode separation portion 30B.

Subsequently, the positive electrode layer green sheet 200A peeled from the substrate 70 and the negative electrode layer green sheet 200B are alternately stacked on the negative electrode layer 10B and the negative electrode separation portion 30B. Here, for example, two positive electrode layer green sheets 200A and two negative electrode layer green sheets 200B are alternately stacked.

Subsequently, the solid electrolyte layer 20 is formed on the negative electrode layer 10B and the negative electrode separation portion 30B by the procedure similar to the procedure for forming the solid electrolyte layer 20, and then the protective layer 60 is formed on the solid electrolyte layer 20 by the procedure similar to the procedure for forming the protective layer 60. Subsequently, the lowermost substrate 60 is peeled off, and thereby a solid-state battery laminate precursor 500Z can be formed.

Finally, the solid-state battery laminate precursor 500Z is heated. In this case, the heating temperature is set so that a series of layers constituting the solid-state battery laminate precursor 500Z is sintered. Other conditions such as heating time can be optionally set.

By this heat treatment, a series of layers constituting the solid-state battery laminate precursor 500Z is sintered, so that the series of layers is pressure-bonded. Therefore, the solid-state battery laminate 500' can be preferably integrally formed as a sintered body.

Step of Forming Positive Electrode Terminal and Negative Electrode Terminal

For example, a positive electrode terminal is bonded to the solid-state battery laminate using a conductive adhesive, and a negative electrode terminal is bonded to the solid-state battery laminate using, for example, a conductive adhesive. As a result, each of the positive electrode terminal and the negative electrode terminal is attached to the solid-state battery laminate body, so that a solid-state battery is completed.

Although the embodiments of the present invention have been described above, only typical examples have been illustrated. Therefore, those skilled in the art will easily understand that the present invention is not limited thereto, and various aspects are conceivable without changing the gist of the present invention.

For example, in the above description, for example, the solid-state battery exemplified in FIG. 3A and the like has been mainly described, but the present invention is not necessarily limited thereto. In the present invention, any material can be similarly applied as long as it has a positive electrode layer, a negative electrode layer, and a solid electrolyte layer, and a terminal contact portion in at least one of the positive electrode layer and the negative electrode layer has a relatively small active material amount with respect to the non-terminal contact portion.

The solid-state battery of the present invention can be used in various fields where electric storage is assumed. Although it is merely an example, the solid-state battery of the present invention can be used in the fields of electricity, information, and communication in which electricity, electronic equipment, and the like are used (for example, electric and electronic equipment fields or mobile equipment fields including mobile phones, smartphones, notebook computers and digital cameras, activity meters, arm computers, electronic papers, and small electronic machines such as RFID tags, card type electronic money, and smartwatches), home and small industrial applications (for example, the fields of electric tools, golf carts, and home, nursing, and industrial robots), large industrial applications (for example, fields of forklift, elevator, and harbor crane), transportation system fields (field of, for example, hybrid automobiles, electric automobiles, buses, trains, power-assisted bicycles, and electric two-wheeled vehicles), power system applications (for example, fields such as various types of power generation, road conditioners, smart grids, and household power storage systems), medical applications (medical equipment fields such as earphone hearing aids), pharmaceutical applications (fields such as dosage management systems), IoT fields, space and deep sea applications (for example, fields such as a space probe and a submersible), and the like.

DESCRIPTION OF REFERENCE SYMBOLS

10: Electrode layer
11: Electrode terminal contact portion
$11_1$: First region (at electrode terminal contact portion)
$11_2$: Second region (at electrode terminal contact portion)
12: Electrode non-terminal contact portion
10A: Positive electrode layer
10'A: Positive electrode active material layer
11A: Positive electrode terminal contact portion
$11A_1$: First region (at positive electrode terminal contact portion)
$11A_2$: Second region (at positive electrode terminal contact portion)
12A: Positive electrode non-terminal contact portion
10B: Negative electrode layer
10'B: Negative electrode active material layer
11B: Negative electrode terminal contact portion
$11B_1$: First region (at negative electrode terminal contact portion)
$11B_2$: Second region (at negative electrode terminal contact portion)
12B: Negative electrode non-terminal contact portion
20: Solid electrolyte layer
30: Electrode separation portion
30A: Positive electrode separation portion
30B: Negative electrode separation portion
40: Terminal
40A: Positive electrode terminal
40B: Negative electrode terminal
50: Current collecting layer
60: Protective layer
70: Support substrate (substrate)
100: Ion
200: Green sheet
200A: Positive electrode layer green sheet
200B: Negative electrode layer green sheet
500Z: Solid-state battery laminate precursor
500': Solid-state battery laminate
500'A: Positive electrode side end surface
500'B: Negative electrode side end surface
500: Solid-state battery

The invention claimed is:

1. A solid-state battery comprising:
a solid-state battery laminate having at least one battery constituent unit including a positive electrode layer, a negative electrode layer, and a solid electrolyte layer interposed between the positive electrode layer and the negative electrode layer along a stacking direction;
a positive electrode terminal on a first side surface of the solid-state battery laminate; and
a negative electrode terminal on a second side surface of the solid-state battery laminate, wherein
the positive electrode layer and the negative electrode layer each include a terminal contact portion and a non-terminal contact portion other than the terminal contact portion, wherein the terminal contact portion of the positive electrode layer is in direct contact with the positive electrode terminal and the terminal contact portion of the negative electrode layer is in direct contact with the negative electrode terminal,
in at least one of the positive electrode layer and the negative electrode layer, an active material density of the terminal contact portion is smaller than an active material density of the non-terminal contact portion,
in the at least one of the positive electrode layer and the negative electrode layer, the terminal contact portion is made of an electrode material which is a same kind as an electrode material of the non-terminal contact portion and has a smaller active material density than the electrode material of the non-terminal contact portion, and
in the at least one of the positive electrode layer and the negative electrode layer, a density ratio of the electrode material of the terminal contact portion to the non-terminal contact portion is 0.1 to 0.5.

2. The solid-state battery according to claim 1, wherein the terminal contact portion of the at least one of the positive electrode layer and the negative electrode layer includes a first region including an insulating material and a second region not including the insulating material.

3. The solid-state battery according to claim 2, wherein in a sectional view of the solid-state battery laminate, the first region and the second region are stacked on each other along the stacking direction.

4. The solid-state battery according to claim 3, wherein in the sectional view of the solid-state battery laminate, in the at least one of the positive electrode layer and the negative electrode layer, a thickness dimension of the second region is smaller than a thickness dimension of the non-terminal contact portion.

5. The solid-state battery according to claim 2, wherein in a sectional view of the solid-state battery laminate, in the at least one of the positive electrode layer and the negative electrode layer, a thickness dimension of the second region is smaller than a thickness dimension of the non-terminal contact portion.

6. The solid-state battery according to claim 2, wherein the solid-state battery laminate has a configuration in which the first region and the second region are adjacent to each other in a plan view of the solid state battery laminate.

7. The solid-state battery according to claim 6, wherein in the plan view of the solid-state battery laminate, in the at least one of the positive electrode layer and the negative electrode layer, a width dimension of the second region is smaller than a width dimension of the non-terminal contact portion.

8. The solid-state battery according to claim 2, wherein in a plan view of the solid-state battery laminate, in the at least one of the positive electrode layer and the negative electrode layer, a width dimension of the second region is smaller than a width dimension of the non-terminal contact portion.

9. The solid-state battery according to claim 2, wherein, in the at least one of the positive electrode layer and the negative electrode layer, the second region and the non-terminal contact portion are formed of the same material.

10. The solid-state battery according to claim 1, wherein, in the at least one of the positive electrode layer and the negative electrode layer, the terminal contact portion includes a plurality of first regions including an insulating material and a second region not including the insulating material.

11. The solid-state battery according to claim 10, wherein the plurality of first regions are uniformly distributed in the second region.

12. The solid-state battery according to claim 1, wherein in a sectional view of the solid-state battery laminate, in the at least one of the positive electrode layer and the negative electrode layer, at least a portion of the terminal contact portion does not directly face an adjacent electrode layer in the stacking direction.

13. The solid-state battery according to claim 1, wherein the positive electrode layer and the negative electrode layer are layers capable of occluding and releasing lithium ions.

14. The solid-state battery according to claim 1, wherein the terminal contact portion of the at least one of the positive electrode layer and the negative electrode layer does not face an opposite polarity electrode layer in the stacking direction.

15. The solid-state battery according to claim 14, wherein the solid electrolyte layer exists around the at least one of the positive electrode layer and the negative electrode layer so as to protrude from between the positive electrode layer and the negative electrode layer.

\* \* \* \* \*